LOW PASS INVERTER

Original Filed Jan. 31, 1962

INVENTOR
Reginald I. Gray

BY Claude Funkhouser
ATTORNEY

United States Patent Office 3,185,913
Patented May 25, 1965

3,185,913
LOW PASS INVERTER

Reginald I. Gray, 513 Sampson Road, Dahlgren, Va.

Original application Jan. 31, 1962, Ser. No. 170,031. Divided and this application May 28, 1963, Ser. No. 284,293
6 Claims. (Cl. 321—49)

This application is a division of application Serial No. 170,031 filed January 31, 1962, for a transformer.

This invention relates to a low pass electromechanical inverter combination, and more particularly to an inverter capable of converting a D.C. input into an A.C. output while at the same time attenuating any chance radio frequency input energies.

Such inverters, in general, find application wherever it is desirable to convert a D.C. signal into some form of an A.C. signal in order to make use of purely A.C. circuit devices. Further, there are many instances where a device is desired that will exhibit a relatively small loss to a D.C. source while substantially reducing a high frequency signal. For example, this is almost always the requirement where ordnance firing circuits are concerned. If the explosive charge in a missile, for example, is designed to function when a signal of sufficient magnitude is applied to the firing leads, it may readily be seen that any spurious high frequency electromagnetic fields would represent a danger to the proper operation of the device. Whether the unwanted field had its source from within the missile itself or from an unknown exterior location, it could induce a voltage at its frequency in any conductor passing through it. If the induced voltage was of a sufficient magnitude, it could readily cause the ignition of the explosive charge.

In many ordnance designs, the firing voltage is D.C. This is advantageous in that D.C. power can be made readily available through batteries and such, but suffers the usual disadvantages inherent to the use of D.C.: it cannot be stepped up or down via transformers, etc.

In order to convert D.C. signals to A.C., it has been the practice to resort to devices similar to the familiar auto-radio vibrator or to electronic circuits.

The former usually has the disadvantage of a great many moving parts, most of which are quite small and, therefore, subject to mechanical failure.

Further, experience has shown such units to have quite unpredictable life spans which renders them unacceptable for high performance systems.

The latter functions well but encounters the problems of power supply, heat dissipation, component failure, etc.

In order to consturct a device having relatively high impedance to A.C., it has been the practice in the past to have recourse to low pass dissipating or non-dissipating electric filters or electro-mechanical devices.

Inasmuch as neither the frequency of the spurious voltage nor the impedance of its source can be specified, it would be extremely difficult, if not impossible, to design an electric filter to always pass D.C. relatively unattenuated while blocking A.C. regardless of the frequency. That is, at some frequency, the impedance of the filter plus the impedance of the unknown source could combine to equal the conjugate of the load impedance with the result that the filter would become a matching section and transfer maximum power to the load.

Electro-mechanical filters usually have very good low frequency band pass characteristics but suffer several disadvantages in protecting ordnance from harmful and completely random induced energies. Usually, due to mechanical inertia, their high frequency response is unpredictable. Further, they generally comprise several moving parts encountering the usual problems of wear, breakage, etc.

The instant invention, then, provides a device able to utilize D.C. power while at the same time reducing any spurious radio frequency energies to a point where they become harmless to the protected circuits. This is accomplished by the interposition of an electromagnetic shield in the flux path of the primary coil, which shield further serves as the driving source for a current interrupter.

It is, therefore, an object of this invention to provide a device capable of transducing a D.C. signal into a corresponding A.C. signal.

It is a further object of this invention to provide a device capable of transducing a D.C. signal into a corresponding A.C. signal, while functioning as a low pass filter.

A still further object of this invention is the provision of a transformer having a low pass characteristic capable of passing power into a shielded enclosure without allowing penetration into the enclosure of significant levels of power at radio frequencies.

Other objects, advantages and novel features of the invention will become apparent form the following detailed description of the invention when considered in conjunction with the accompanying drawings wherein.

Figure 1:
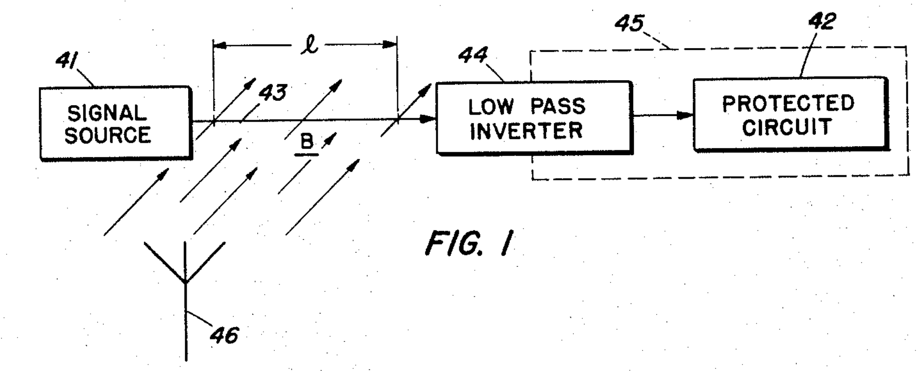
FIG. 1 illustrates the general application of the invention.

Referring to FIG. 1, there is shown a circuit with a signal source 41 connected to a protected circuit 42 via a transmission line 43.

If the connecting transmission line 43 is of any substantial length, then the danger of energies being induced in it by spurious field sources is encountered. Thus, if a source of electromagnetic energy, such as a radiating antenna 46, were to cause a field to link the transmission line 43 along a length *l*, a voltage at the frequency of the changing field would be induced in the transmission line 43.

To further aid in the understanding of the above, consider a missile on a ballistic course. The circuit to be protected, 42, is the final firing circuit controlling the firing of a warhead. A D.C. signal source 41 is the source of energy to be used in powering the firing circuit. Connecting the source of energy to the firing circuit is a transmission line 43. If, during the flight of the missile, a field was to link the transmission line 43, and, if the resulting induced voltage was of sufficient amplitude, then the result would be a premature detonation. It is to prevent such a result that the invention 44 is interposed between the final firing circuit and the signal source 41. By operating in a manner to be disclosed in connection with FIG. 2, the invention 44 allows the low frequency components of the inverted D.C. current of signal source 41 to pass relatively unattenuated while blocking any high frequency energies induced by spurious sources as from antenna 46. Also provided is an electromagnetic shield 45 which serves to isolate the invention and the protected circuit from further spurious fields in a manner to be described in detail below.

Figure 2:
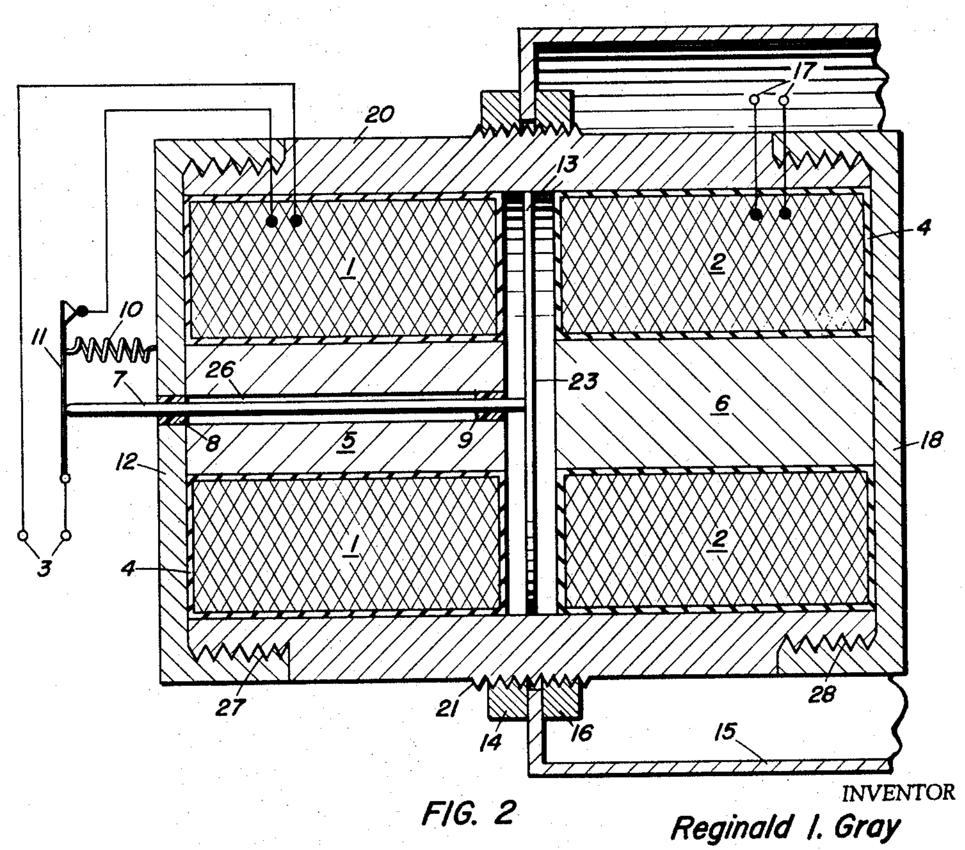
FIG. 2 is a cross-sectional view of the invention.

Referring now to FIG. 2, there is shown a transformer primary coil 1 and a secondary coil 2, constructed upon the same magnetic axis. The primary coil is wound about a ferro-magnetic core 5, which is constructed with an aperture 26 through its central axis. The secondary coil 2 is wound about a cylindrical ferro-magnetic core 6. Both the primary coil 1 and the secondary coil 2 are provided with exterior insulation 4 to electrically isolate them from the magnetic circuit. The lateral transformer body is composed of a cylindrical metallic sleeve 20. The sleeve is fitted with recessed threading at both ends 27, 28 to provide for the attaching of end cups 12 and 18 to complete the magnetic circuit of the transformer. The sleeve is additionally provided with exterior threading 21 at its longitudinal center, the purpose of which is to allow the placing of rings 14 and 16 which serve to mount the transformer body and further to position an exterior electromagnetic sleeve 15, the operation of which will be explained below. The transformer is constructed such that there is a longitudinal space remaining between the interior walls of the primary and secondary coils. Into this space is placed a thin diaphragm 23 composed of a high permeability alloy. This diaphragm is of the same shape as the traverse cross section of the interior of the lateral sleeve 20, and the periphery of the diaphragm is rigidly attached to the interior of the sleeve at 13. Attached in turn to the diaphragm 23 at its radial center is a rod 7, which extends through aperture 26 of the primary core 5 to the outside of the end cap 12 which is provided with a centrally located aperture for that purpose. Each extremity of the aperture 26 is equipped with bearings 8, 9, the function of which is to allow freedom of movement and to position the rod 7. The diaphragm, then, is so constructed that its periphery is held immovable by attachment to the lateral sleeve, while its central portion is relatively free to move and thereby cause longitudinal movement of the rod 7. The function of the longitudinal movement of the rod 7 is to make and break the input line to the primary coil. It should be noted that the particular switch means illustrated herein does not comprise the limit of the invention. Rather, any switch means which could be actuated by rod 7, and interposed in the input line of primary coil 1 could be used in its place. The switch means illustrated is shown for purposes of explanation only. In the simple switch as shown, the rod 7 is made to operate a switch arm 11 which is mechanically restrained by the spring 10. The input line to the primary coil is provided with terminals at 3 to be connected with a D.C. power source, not shown. The D.C. power is transmitted into the primary coil via the terminals 3 and switch 11. If the rod 7 is caused by the diaphragm 23 to move longitudinally toward the switch, the switch 11 will be opened, and the power to the primary coil 1 will be interrupted. It may be seen, then, that if the diaphragm 23 were caused to move longitudinally in a repetitive manner, thereby opening and closing switch 11, that a pulsating magnetic flux would be induced in the magnetic circuit of the device, inducing in turn a pulsating output voltage across terminals 17 of the secondary coil 2. The body of the transformer, however, may be either permanently magnetized or unmagnetized. If the body is unmagnetized, the diahpragm 23 will be attracted towards the primary coil 1 of the transformer each half cycle of the switching action. If the body is permanently magnetized, the diaphragm 23 will vibrate at the fundamental frequency determined by its mechanical size, such as thickness and radial length. When D.C. power is applied then, at the input terminals 3, the normally closed contact 11 will allow energization of the primary coil 1 which, in building up a field, will attract the electromagnetic diaphragm member 23 towards itself, thereby causing the movement of rod 7 and the opening of the contact 11. This in turn breaks the input circuit and allows dissipation of the field built up by the primary coil 1. Upon dissipation of the field, the spring 10 will again urge the contact 11 into a closed position whereupon the primary coil 1 will again be energized and the cycle repeated. It should, of course, be understood that if the body of the transformer is permanently magnetized it should be so polarized that when the D.C. energizes the primary coil, an addition to the existing field will be caused rather than a detraction therefrom.

It is noted that when primary coil 1 is first energized, and a magnetic field induced thereby, the field will start at zero at the center of the core of the primary coil and build up in a radial direction until all of the flux is contained within the magnetic circuit. Therefore, for the building field to be confined to the path of least reluctance, i.e., the magnetic circuit, it must first penetrate the diaphragm 23. The instant invention is based on the concept, then, of interposing an electromagnetic shield between the primary and secondary windings of a transformer, so that as frequency increases, the magnetic field is progressively attenuated in penetrating the interposed shield in accordance with the well-established law of wave propagation in metal:

$$\gamma=\alpha+j\beta\simeq(1+j)\sqrt{\frac{\mu\omega\sigma}{2}}$$

where $\alpha=Re\gamma$=attenuation function (nepers/meter)
$\beta$=phase function (radian/meter)
$\mu$=initial permeability of the metal (henry/meter)
$\omega$=radial frequency of the signal (radian/second)
$\sigma$=conductivity of the metal (mho/meter)

It is seen then, that the attenuation of the magnetic field piercing the barrier 23 is dependent upon the properties of the material of the barrier and the frequency of the incident field. It is seen further that the attenuation of the incident magnetic field increases as the frequency of the field:

$$\alpha\simeq\sqrt{\frac{\mu\omega\sigma}{2}}$$

$$\simeq\sqrt{2\pi\mu\sigma}\sqrt{f}$$

$$\therefore\alpha\simeq K\sqrt{f}$$

The physical thickness of the shield 23 is determined by consideration of the expression for "skin depth":

$$\delta=\frac{1}{\alpha}\simeq\sqrt{\frac{2}{\omega\mu\sigma}}\qquad\text{(meter/neper)}$$

Skin depth is defined as the distance at which both the electric field (E) and the magnetic field (H) are attenuated to a value of $e^{-1}$ of their respective magnitudes at the surface, and it is also the distance at which the phase of the incident wave is retarded by one radian. Further, the electromagnetic barrier between the primary and secondary windings also completely eliminates capacitive coupling between them and eliminates, therefore, the inphase or push-pull mode of electric coupling through the transformer. The elimination of the capacity coupling serves, of course, to eliminate the usual means by which high frequency power is transferred through the transformer.

The invention is shown in FIGS. 1 and 2 with an outer container comprising an electromagnetic shield (FIG. 1, 45; FIG. 2, 15). Such a shield acts to attenuate magnetic fields impinging upon it from any direction. If the container is constructed of a non-magnetic material, such as copper, aluminum, or brass, and assuming that the container forms a complete electrical circuit, then a varying magnetic field will be attenuated upon penetrating it. The attenuating effect varies with the square root of the frequency so that, as the frequency increases, the shielding effect is greatly improved.

It can be seen from FIG. 2, then, that the shield 15 is so constructed as to enclose the secondary coil 2. This acts in conjunction with the electromagnetic shield 23 of the invention to assure that no energies are induced in the secondary by any spurious sources.

The instant invention is highly advantageous since it enables D.C. supplies to be used. There can be no anomalous pass band due to stray capacitances or other effects in any modes of excitation at high frequencies where the magnetic field of attenuation predominates.

Obviously many modifications and variations of the present invention are possible in the light of the above teachings. It is therefore to be understood that within the scope of the appended claims the invention may be practiced otherwise than as specifically described.

What is claimed is:

1. A low pass direct current to alternating current inverter comprising:

first means for concentrating magnetic flux;

means for generating a magnetic field, said generating means having an electrical input line, and said generating means being spatially arranged around said first means about a longitudinal axis;

second means for concentrating magnetic flux, said second means having a movable central portion and a non-movable peripheral portion, said second means being positioned such that its central axis coincides with the magnetic axis of said generating means;

means for interrupting electrical current flow, said means being placed in the input line of said generating means; and said interrupting means being directly controlled by the movable central portion of said second flux conducting means whereby the flow of electrical power to said flux generating means may be turned on or off by the movement of said second flux conducting means.

2. In a direct current to alternating current converter, the combination comprising:

a transformer core;

a coil wound on said core, said coil having input terminals;

a cylindrical shell arranged to position said coil within its bore, said shell to function as an outer transformer body;

an end cap attached to one end of said shell and to one end of said core;

a metallic diaphragm of the same shape as the cross-sectional area of said shell, said diaphragm being attached to the end of said shell opposite said end cap, and having a centrally located movable area, said diaphragm being further attached to a projecting means in the region of the said movable area;

a current interrupting means, said interrupting means being interposed between said input terminals and said coil; and said projecting means being arranged to activate said current interrupting means whereby upon a particular movement of said diaphragm, said current interrupting means serves to stop or start current flow to said coil.

3. In a low pass D.C. to A.C. converter, the combination comprising:

a cup-shaped transformer body having an aperture through its end portion;

a multi-turn ring-shaped coil attached to the interior of said cup-shaped body such that the magnetic axis of said coil coincides with the longitudinal axis of said cup-shaped body, said coil having input lines;

a tubular transformer core of the same axial length, as the axial length of said coil, said core being concentric and linearly co-extensive with said coil and located within the interior diameter of said coil;

a diaphragm of the shape of the cross-section of said cup, said diaphragm being fixedly attached at its periphery to the interior surface of said cup, said diaphragm further having a movable central portion to which is attached an actuating rod;

said actuating rod extending through the bore of said tubular transformer core and through said aperture of said transformer body;

a bistable device interposed in said input lines of said coil, said device having a first state completing the input circuit to said coil and a second state opening the input circuit to said coil, the state of said bistable device depending upon the movement of said actuating rod whereby the flow of electrical power to said coil through said input lines is controlled by the said movable central portion of said diaphragm.

4. A converter as in claim 3 further comprising:

a shielding enclosure exterior to said transformer body and being fixedly attached to said body whereby high frequency magnetic and electrostatic radiation is substantially attenuated by said enclosure.

5. In a low pass D.C. to A.C. converter, the combination comprising:

a tubular structure of magnetic material;

a first end cap closing off the first end of said structure, said end cap having a centrally located aperture;

a second end cap closing off the second end of said structure;

a first annular-shaped coil concentric with said structure and abutting the interior face of said first end cap;

a second annular-shaped coil concentric with said structure and abutting the interior face of second end cap; the sum of the lengths of said first coil and said second coil being less than the length of said tubular structure;

input terminals for supplying electrical power to said first coil;

input conductors connecting said input terminals to said first coil;

a diaphragm comprising an electromagnetic shield positioned perpendicularly to the magnetic axis of said coil, said diaphragm being rigidly attached at its periphery to the interior wall of said structure and spaced between the interior ends of said coils, said diaphragm having a movable central portion;

an actuating rod rigidly attached to the said central portion of said diaphragm and extending along the axis of said first coil and through said aperture of said first end cap;

switch means interposed in said input conductors for making and breaking the electrical connection between said input at the terminals and operated by an actuating rod whereby the intermittent opening and closing of said switch means causes an alternating voltage to be induced in said second coil.

6. A converter as in claim 5 further comprising an enclosing shield situated around that part of said structure containing said second coil whereby said shield serves to attenuate high frequency and electrostatic radiation associated with said second coil.

References Cited by the Examiner

UNITED STATES PATENTS 2,136,337 11/38 Green et al. ____________ 321—49

LLOYD McCOLLUM, *Primary Examiner.*